United States Patent [19]

Suprono

[11] Patent Number: 4,824,057
[45] Date of Patent: Apr. 25, 1989

[54] HANGER

[75] Inventor: Paul W. Suprono, East Greenwich, R.I.

[73] Assignee: Nortek Corporation, Providence, R.I.

[21] Appl. No.: 100,337

[22] Filed: Sep. 23, 1987

[51] Int. Cl.⁴ .............................................. E21F 17/02
[52] U.S. Cl. ...................................... 248/62; 403/347;
24/343; 24/129 B; 24/546
[58] Field of Search .............................. 248/59, 61–62,
248/74.1, 74.2, 217.1, 301, 316.7, 327, 328, 339,
410; 403/346, 347; 24/339, 343, 129 B, 129 R,
546, 555, 563

[56] References Cited

U.S. PATENT DOCUMENTS

| | | | |
|---|---|---|---|
| 810,004 | 1/1906 | Tabler | 24/343 |
| 886,241 | 4/1908 | Norton | 248/339 |
| 936,767 | 8/1909 | Van Eyck . | |
| 1,161,268 | 11/1915 | Tuck | 248/301 |
| 1,308,869 | 7/1919 | Rohmer | 248/301 |
| 2,588,251 | 3/1952 | Kost | 248/74.2 |
| 2,627,124 | 2/1953 | La Rock | 24/129 B |
| 2,627,448 | 2/1953 | Horton | 24/129 B |
| 2,765,136 | 3/1955 | Knapp . | |
| 2,774,562 | 5/1955 | Henry . | |
| 2,805,277 | 9/1957 | Moeller . | |
| 2,969,947 | 1/1961 | Tonnesson . | |
| 3,064,933 | 11/1962 | Brasty . | |
| 3,088,024 | 4/1963 | Lowell . | |
| 3,108,828 | 10/1963 | Kus | 248/74.2 |
| 3,194,524 | 7/1965 | Trumbull | 248/74.2 |
| 3,288,408 | 11/1966 | Acher . | |
| 3,381,824 | 5/1968 | Blumenschein . | |
| 3,888,448 | 6/1975 | Rowland . | |

FOREIGN PATENT DOCUMENTS

| | | | |
|---|---|---|---|
| 3312865 | 10/1984 | Fed. Rep. of Germany | 248/74.1 |
| 125039 | 4/1919 | United Kingdom | 248/339 |

Primary Examiner—J. Franklin Foss
Assistant Examiner—Robert A. Olson

[57] ABSTRACT

A hanger for suspending armored cable from a vertical wire holds the cable to one side of the wire and includes a sharp edge that engages the wire on the side opposite the cable; a force is applied to press the sharp edge against the wire to prevent the hanger from slipping down along the wire. In other aspects, the hanger is supported from only a single location on the wire; the hanger includes a slot into which the wire may be slipped to reach a position where the wire is grasped by the hanger; and the cable holding portion of the hanger includes a rib to seat in the helical groove of the armored cable.

10 Claims, 1 Drawing Sheet

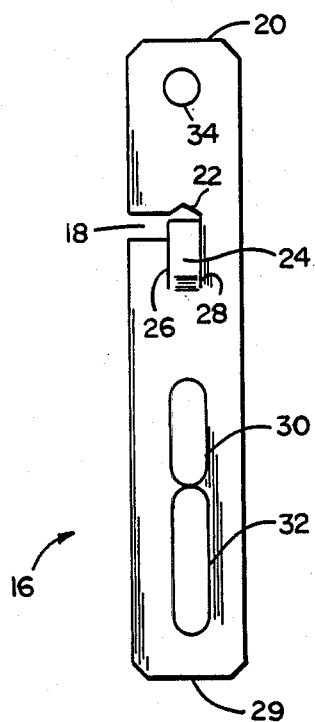
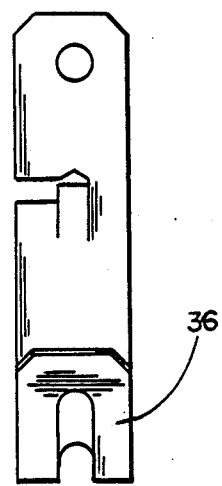
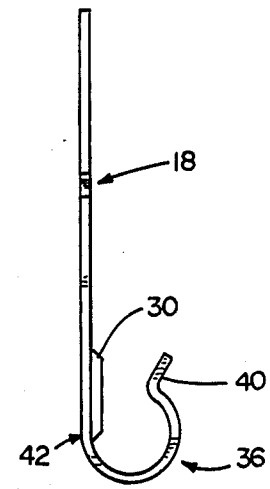
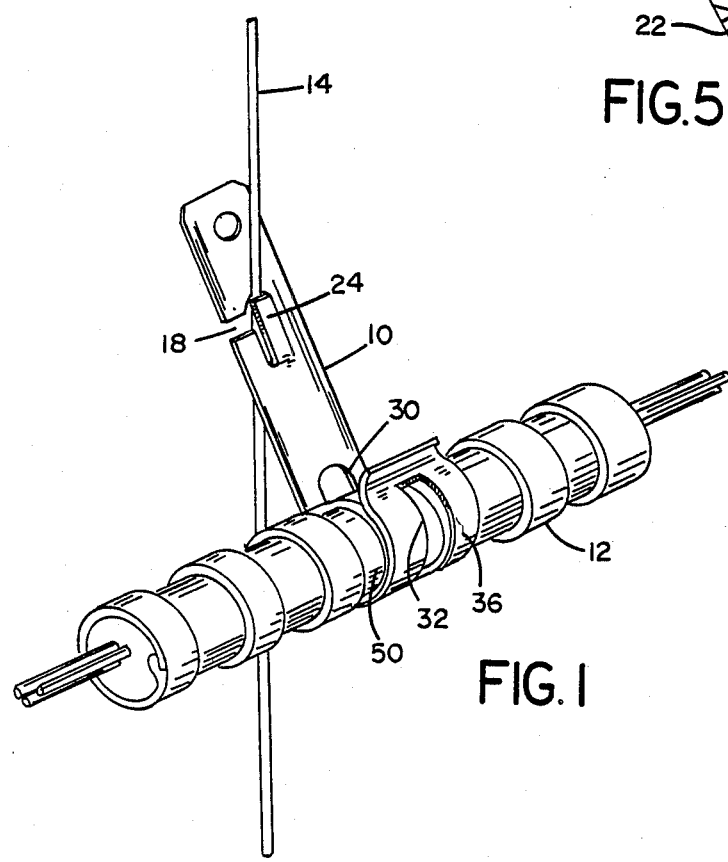
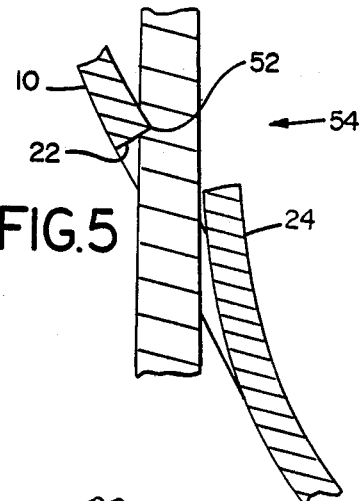

HANGER

BACKGROUND OF THE INVENTION

This invention relates to hangers for armored electrical cable.

It is known to hang such cable from the vertical wires that support a suspended ceiling beneath the structural ceiling of a building. One type of hanger is a long clip that is hooked at both ends onto the vertical wire; the cable is gripped between the middle of part of the clip and the wire.

Another part of hanger attaches to a metal stud and holds the armored cable in a position running parallel to the stud.

SUMMARY OF THE INVENTION

A general feature of the invention provides a hanger in which a cable gripper holds the cable to one side of the wire, a sharp edge engages the surface of the wire on the side of the wire opposite the cable, and a force is applied to press the sharp edge against the wire to prevent the hanger from slipping down along the wire.

In another general feature of the invention, the hanger has a cable gripper at one end for holding the cable, and a mechanism at the other end for supporting the hanger at only a single location along the wire.

In another general feature of the invention, the cable is of the kind having a helical groove on the outside of the cable sheath, and the cable holding portion of the hanger includes a rib arranged to seat in the groove.

In another general feature of the invention, the hanger includes a slot into which the wire may be slipped to reach a position where the wire is grasped by the wire grasping mechanism.

Preferred embodiments of the invention include the following features.

The force that presses the sharp edge against the wire is enhanced when gravity causes the cable to pull down on the hanger. There are a pair of the sharp edges formed as a V-notch on a flat plate. The force is applied by a resilient finger (formed on a flat plate in a position adjacent the sharp edges). The force of the cable pulling down on the hanger causes bending of the finger.

The cable gripper is formed at one end of a flat plate and the sharp edge and the mechanism for applying the force are formed at another location on the flat plate.

The hanger is simple, inexpensive to manufacture, and easy to use. It can be attached at any place along the vertical wire and detached easily. Because the hanger is attached to the wire at only one location, wire distortion is minimized and the ceiling surface, held by the wire, remains undistorted. The cable can be easily attached to and detached from the hanger and, when attached, the rib prevents it from moving longitudinally. The rib also enables different size cables to be used. The V-shaped slot provides two sharp edges for biting into the wire while accommodating wires of different diameters.

Other features and advantages of the invention will be apparent from the following description of the preferred embodiment and from the claims.

DESCRIPTION OF THE PREFERRED EMBODIMENT

We first briefly describe the drawings.

FIG. 1 is an isometric view of a cable hanger in use;

FIG. 2 is a top view of a blank for forming the hanger.

FIGS. 3, 4 are side and top views, respectively, of the finished hanger.

FIG. 5 is a side sectional view showing how the hanger is supported.

STRUCTURE AND MANUFACTURE

Referring to FIG. 1, a hanger 10 supports an armored cable 12 on a vertical wire 14 (of the kind that supports a suspended ceiling beneath a structural ceiling.)

Referring to FIG. 2, hanger 10 is formed from a steel blank 16 (type 1071 or 1074, hardened and tempered to Rockwell 46/48) 0.032" thick, 3.64" long, and 0.625" wide. A slot 18, cut at a point 15/16 inches from one end 20 of hanger 10, has dimensions of ⅛ inch (along the length of the hanger) by 7/32 inch. At the inner end of slot 18 is a V-shaped hole 22 and an associated gripping finger 24. The sides of V-shaped hole 22 are each at a 30° angle to the horizontal in FIG. 2. Gripping finger 24 (⅜ inch long by 3/16 inch wide) is formed by two parallel cuts 26, 28.

At the other end 29 of hanger 10, a rib 30 is formed (3/16 inch wide, ⅜ inch long and 0.080 inches high). A slot 32 extends from the end of rib 30 to within 9/32 inch of end 29. A 3/16 inch diameter screw hole 34 is drilled with its center ¼ inch from end 20.

Referring to FIGS. 3 and 4, hanger 10 is bent to form a hook 36 (cable gripper) having a radius of 7/32 inch (centered at a point 2 13/32 inch from end 20), and a lip 40 of length 7/32 inch. Hook 36 is bent beginning at a point 42, 13/32 inch from end 20.

USE

Referring again to FIG. 1, in use, hook 36 is snapped over cable 12 (cables of different diameters will fit.) Slot 32 makes hook 36 more flexible and aids the snapping action. Rib 30 seats in helical groove 50 of the cable, preventing the cable from sliding along its length while permitting the hanger to be easily rotated about the cable casing. Hanger 10 is pushed onto a vertical wire 14 at slot 18 until wire 14 is forced into V-shaped hole 22, with finger 24 being deflected slightly. Cable 12 is then allowed to hang down causing hanger 10 to lie at an angle to wire 14 that is more nearly vertical than horizontal with cable 12 positioned horizontally. Rib 30 also enables hook 36 to securely hold cable of different sizes.

Referring to FIG. 5, in this position, finger 24 is flexed further and presses wire 14 against the relatively sharp edges 52 of V-shaped hole 22. Those sharp edges bite into the wire on the side of the wire opposite the cable, supporting the hanger and preventing it from slipping down the wire. Thus hanger 10 supports the cable at essentially a single location 54 on wire 14, thus reducing distortion of the wire. If need be, the hanger may later be removed simply by detaching it from wire 14 via slot 18 and snapping hook 36 off cable 12.

The hanger may alternatively be used to mount the cable to a wall using screw hole 34.

Other embodiments are within the following claims.

I claim:

1. A hanger for suspending armored cable from a vertical wire, said hanger having a mechanism for grasping said wire, said mechanism including a notch having a sharp edge for engaging a surface of said wire, a flexible finger adjacent said notch and associated with said sharp edge for applying a force to press said sharp edge against said wire to prevent said hanger from slipping down along said wire, and a slot which extends from an edge of said hanger to said notch and into which said wire may be slipped to reach a position where said sharp edge engages said wire and said finger applies said force to press said sharp edge against said wire.

2. The hanger of claim 1 wherein said force is applied in a manner such that said force is enhanced when gravity causes said cable to pull down on said hanger.

3. The hanger of claim 2 wherein said force is applied on said wire by said flexible finger, and the force of said cable pulling down on said hanger causes bending of said finger.

4. The hanger of claim 1 wherein there are a pair of said sharp edges on said notch.

5. The hanger of claim 4 wherein said sharp edges are formed on a flat plate.

6. The hanger of claim 4 wherein said sharp edges are formed as a V-shape on a flat plate.

7. The hanger of claim 1 wherein said finger is formed on a flat plate in a position adjacent said sharp edge.

8. The hanger of claim 1 further comprising a cable gripper for holding said cable to one side of said wire.

9. The hanger of claim 8 wherein said cable includes a sheath with a helical groove and said cable gripper comprises an arc-shaped hook for gripping said sheath, and a rib to be seated in said helical groove.

10. The hanger of claim 8 comprising a flat plate and wherein said cable gripper is formed at one end of said flat plate and said sharp edge and said mechanism for applying a force are formed on said flat plate at a location spaced apart from said cable gripper.

* * * * *